June 1, 1943. F. DAWSON 2,320,915
PRE-WELT LASTING MACHINE
Filed June 19, 1941 8 Sheets-Sheet 5

Inventor.
Fred Dawson
by Heard Smith & Tennant.
Attys.

June 1, 1943. F. DAWSON 2,320,915
PRE-WELT LASTING MACHINE
Filed June 19, 1941 8 Sheets-Sheet 6

Inventor.
Fred Dawson
by Heard Smith & Tennant
Attys.

Inventor.
Fred Dawson
by Heard Smith & Tennant.
Attys.

Inventor.
Fred Dawson
by Heard Smith & Tennant.
Attys.

Patented June 1, 1943

2,320,915

UNITED STATES PATENT OFFICE 2,320,915

PRE-WELT LASTING MACHINE

Fred Dawson, West Roxbury, Mass., assignor to Compo Shoe Machinery Corporation, Boston, Mass., a corporation of Delaware Application June 19, 1941, Serial No. 398,777

21 Claims. (Cl. 12—12)

This invention relates to pre-welt lasting machines, that is, lasting machines adapted to last shoe uppers to which the welt has been previously stitched.

Lasting machines of this type are commonly provided with a plurality of wiper elements adapted to engage in the crease between the upper and the welt attached thereto and by their operative movement draw the welted edge of the upper over the bottom of the last and thereafter form a support for the welt while the outsole is adhesively secured to the shoe bottom.

When an assembled last and pre-welted shoe upper are placed in a lasting machine for the lasting operation, there is a tendency sometimes for the upper and the welt at the sides of the shoe to sag somewhat so that the welt may assume a position in or below the path of movement of the side wipers that are designed to operate on the side or shank portion of the upper, and if this condition obtains, there is a possibility that when the side wipers have their operative movement, they will engage the edge of the welt instead of moving in under the welt to engage the upper at the point where the welt is stitched thereto, thereby producing an imperfect lasting operation.

It is one of the objects of my present invention to provide a novel welt support designed to support the welt at the sides of the shoe and to maintain said welt in a position above the path of movement of the side wipers, so that when the wipers are operated to draw the edge of the upper over the bottom of the last, there will be no interference between the wipers and the welt.

My improved welt support is in the form of two welt-supporting members, one for each side of the shoe, and a further object of the invention is to provide means for controlling the welt supporting members by which they have a retracting movement as the wipers move forward so that said welt supporting members are withdrawn from the path of movement of the wipers after the latter have moved in under the outer edge of the welt.

Another object of the invention is to provide a novel pre-welt lasting machine in which the side wipers, that is, the wipers which act on the sides of the upper at the shank portion of the shoe, have a differential movement with respect to the wipers operating on the toe and heel portions of the shoe, in that said side wipers continue to move forward after the toe and heel wipers have completed their wiping movement. By this means, a better lasting operation at the shank portion of the shoe is secured.

If the outer sole of a shoe of the pre-welted type is to be attached to the shoe bottom by means of adhesive, it is customary for the operator to place an adhesively coated outsole on the shoe bottom after the welted edges of the upper have been drawn over the bottom of the last and to pound the outsole somewhat or subject the outsole to pressure in order to secure proper adhesion between the outsole and the shoe bottom, including the welt.

These pre-welt lasting machines are, therefore, usually provided with a last support which can be moved vertically into contact with the heel portion of the last in order to support the latter while the operator is pounding the outsole, and not infrequently a suitable pawl is provided for holding the last support in its elevated position. In some devices, this pawl is so constructed that it receives the strain due to the hammer blows.

Another object of my invention is to provide a novel construction of last support by which the pawl that retains the last support in its elevated position will be relieved of substantially all of the strain due to any hammer blows delivered onto the outsole or any pressure applied to the outsole.

A further object of the invention is to provide a novel adjustable stop for the treadle by which the machine is actuated, which stop can be set for different widths of shoes to limit the operative movement thereof and thereby the operative movement of the wipers to the correct amount for the particular shoe being lasted.

Further objects of the invention are to improve generally lasting machines of this type in the particulars more fully hereinafter set forth.

In the drawings, wherein I have illustrated a selected embodiment of my invention.

The lasting machine herein illustrated is of that type which is equipped with three toe wipers adapted to operate on the toe portion of the upper, three heel wipers, adapted to operate on the heel portion of the upper and two side wipers adapted to operate on the sides of the shoe upper at the shank thereof.

Both the toe wipers and the heel wipers comprise a center or end wiper and two laterally swinging wipers, one either side of the end wiper.

The toe wipers are indicated at 3, 4 and 5, 3 being the end or center wiper and 4 and 5 being the two swinging wipers.

The heel wipers are shown at 6, 7 and 8, 6 being the center or end heel wiper, and 7 and 8 being the two swinging wipers.

The side wipers which engage the upper at the shank portion of the shoe are shown at 9 and 10 respectively.

All of these wipers are mounted in the upper section 11 of a two-section housing 12, the lower section 13 of said housing resting on and being supported by the pedestal 14.

The end toe wiper 3 is carried by a block 15 (see Fig. 7) which is adjustably mounted on a carriage 16 that is movable longitudinally of the last for performing the lasting operation by means hereinafter set forth.

The adjustment of the block 15 on the carriage 16 is effected by means of an adjusting screw 17 which is carried by the carriage and has screw-threaded engagement with the block. This adjusting screw has a collar 170 which is held seated against the bearing portion 173 of the slide 16 by a spring 172 that encircles the shank of the screw and is confined between said bearing portion 173 and the hand wheel 171 by which the screw is operated.

The swinging wipers 4 and 5 are pivotally mounted at 18 on the carriage 16, and thus these wipers have a forward movement with the end wiper and are also capable of swinging inwardly toward each other for the lasting operation.

The center or end heel wiper 6 is stationary during the lasting operation, although it is capable of being adjusted to correspond to different sizes of shoes. This center wiper 6 is carried by a block 19 which is supported in the upper section 11 of the housing and is capable of being adjusted lengthwise of the shoe by means of an adjusting screw 20 in order to position the heel wiper 6 properly for different sizes of shoes.

The shank of the screw 20 extends through the side wall 141 of the housing section 11 and has a hand wheel 120 on its projecting end by which it may be operated. Said screw has a collar 122 thereon which is held seated against the wall 141 by a spring 123 that encircles the shank of the screw and is confined between said wall 141 and the hand wheel 120.

Figures 6, 7, 8, 9, 10:
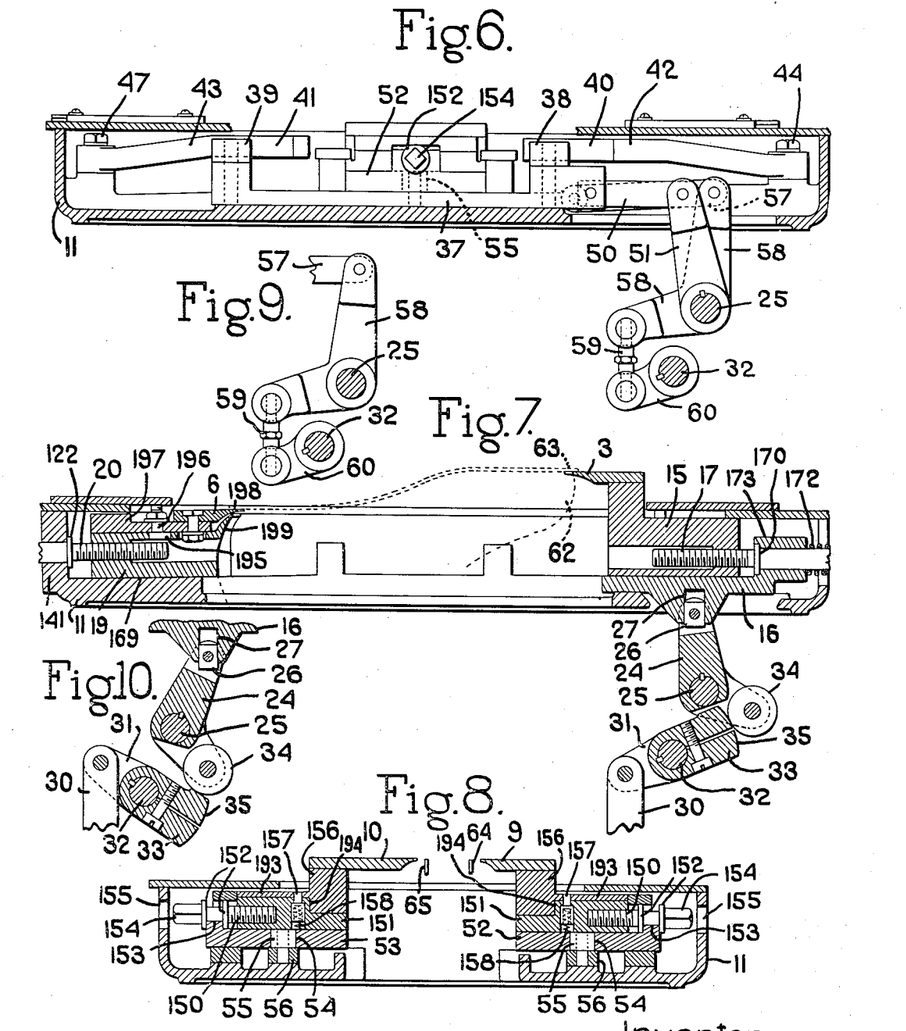
Fig. 6 is a section on the line 6—6, Fig. 4.
Fig. 7 is a section on the line 7—7, Fig. 4.
Fig. 8 is a transverse section on the line 8—8, Fig. 4.
Fig. 9 is a detail of the means for operating the side wiping elements.
Fig. 10 is a fragmentary sectional view of a portion of the means for giving the toe wiping elements their operative movement.

The surface 169 of the housing section 11 on which the block 19 rests is slightly inclined, as seen in Fig. 7, so that when the block is adjusted forwardly, the heel wipers will be raised somewhat, while when the block 19 is adjusted backwardly, said wiper will be lowered.

The block 19 is provided with a concavely curved end face 199 which is designed to engage the counter portion of the shoe during the lasting operation.

The center or end heel wiper 6 is adjustably secured to the block 19 so that the edge 198 of the wiper may be adjusted forwardly or backwardly with relation to the abutment face 199. For this purpose the wiper 6 is shown as being secured to a plate 197 which is mounted on the block 19 but can be adjusted thereon in a direction lengthwise of the last. This plate 197 has a pin 196 rotatably mounted therein which carries at its lower end a circular cam 195 which is eccentric with relation to said pin. This cam occupies an elongated aperture 200 in the block 19. With this construction, the turning of the pin 196 in the plate 197 will operate through the cam 195 to shift said plate forwardly or backwardly, relative to said block 19, and thereby adjust the active edge 198 of the wiper relative to the abutment face 199.

The pin 196 is provided at its upper end with a screw driver slot 201 to enable it to be turned by the use of a screw driver. 202 represents a clamping nut screw-threaded to the upper end of the pin and by which the latter may be clamped in any adjusted position and thus held from turning.

The swinging heel wipers 7 and 8 are carried by swinging arms 21, 22, that are pivoted on the block 19, as shown at 23.

The operative forward movement of the toe end wiper 3 is derived from a rock arm 24 which is fast on a rock shaft 25 that extends transversely of and is journaled in the lower section 13 of the housing 12. This arm 24 carries at its upper end a pivotally mounted block 26 which operates in a vertical slot 27 formed in the slide 16. Rocking movement of the rock shaft 25 will, therefore, give forward and backward movement to the slide 16 and the end toe wiper 3. The rock shaft 25 receives its operative movement by the depression of a treadle 28 fast on a rock shaft 29 journaled in the lower portion of the pedestal 14. This treadle has the lower end of a link 30 pivotally connected thereto, the upper of the link extending into the housing section 13 and being connected to an arm 31 that is fast on a shaft 32 that is parallel to the shaft 25 and is mounted for rocking movement in the lower section 13 of the housing. This arm 31 has an extension 33 adapted to engage a roll 34 carried by the rock arm 24. When the end toe wiper 3 is in its retracted position, the rock arm 24 and the actuating arm 31 will be in the position shown in Fig. 10 with the extension 33 resting against the roll. When the treadle is depressed and the arm 31 is rocked counterclockwise, the extension 33 of the arm operates against the roll 34, thereby rocking the arm 24 and giving forward movement to the slide 16.

The extension 33 is provided with the concentric surface 35, and the construction is such that as the rock arm 31 is being turned counterclockwise, the extension 33 will move out from under the roll 34, and the concentric face 35 of the extension will then wipe by the roll 34, as shown in Fig. 7, thereby locking the slide in its forward position.

The swinging toe wipers 4 and 5 and also the swinging heel wipers 7 and 8 are given their swinging operative movement through the medium of slides 36, 37 which are slidably mounted in the upper section 11 of the two-section head 12 and are given their operative sliding movement by the downward movement of the treadle 28.

Each slide 36, 37 carries two rolls 38, 39 which are adapted to bear against inclined or cam faces 40, 41 respectively, formed on the swinging arms 42, 43. Each arm 42 is pivoted to the upper section 11 of the two-section housing, as shown at 44, and the inner face of each arm 42 bears against a roll 45 carried by a swinging block 46 to which one of the toe side wipers 4 or 5 is secured, said block being pivoted at 18 to the carriage 16.

The swinging arms 43 with which the rolls 39 engage are pivotally mounted to the upper housing section 11, as shown at 47, and the inner face of each arm bears against a roll 48 carried by one of the swinging arms 21 or 22 to which one of the swinging heel wipers is secured.

Figure 4:
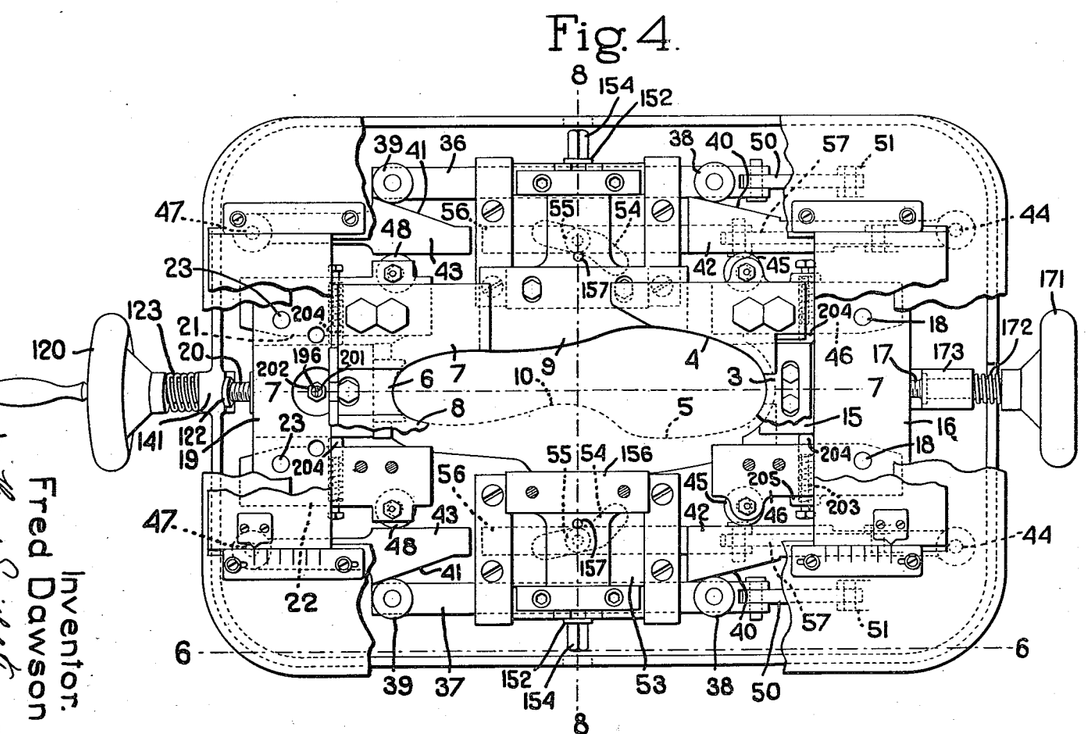
Fig. 4 is a plan view of the lasting machine with parts broken out to better show the construction.

With this arrangement, it will be observed that a movement of the slides 36, 37 to the left, Fig. 4, will cause the rolls 38, 39 to travel along the inclined faces 40, 41, thereby swinging the members 42, 43 inwardly, and this inward swinging movement operates to swing the toe wipers 4 and 5 and the heel wipers 7 and 8 inwardly.

Since the swinging blocks 46 are pivoted at 18 to the carriage 16 which has an operative movement in the direction of the length of the last, the inward swinging movement of the toe wipers 4, 5, will take place while said wipers are moving toward the left, Fig. 4, with the center wiper 3.

Each slide 36, 37, is connected by a link 50 to an arm 51 which is fast on the shaft 25 carrying the arm 24 through which the carriage 16 is moved.

The rocking of the shaft 25 from the position shown in Fig. 10 to that shown in Fig. 7, as above described, will, therefore, move the carriage 16 and the toe wipers 3, 4 and 5 forwardly, and will, at the same time, give operative movement to the slides 36, 37, thereby causing both the side toe wipers 4, 5, and the side heel wipers 7, 8, to be swung inwardly, these movements of the wipers serving to draw the toe and heel portions of the upper over the last.

Figure 1:
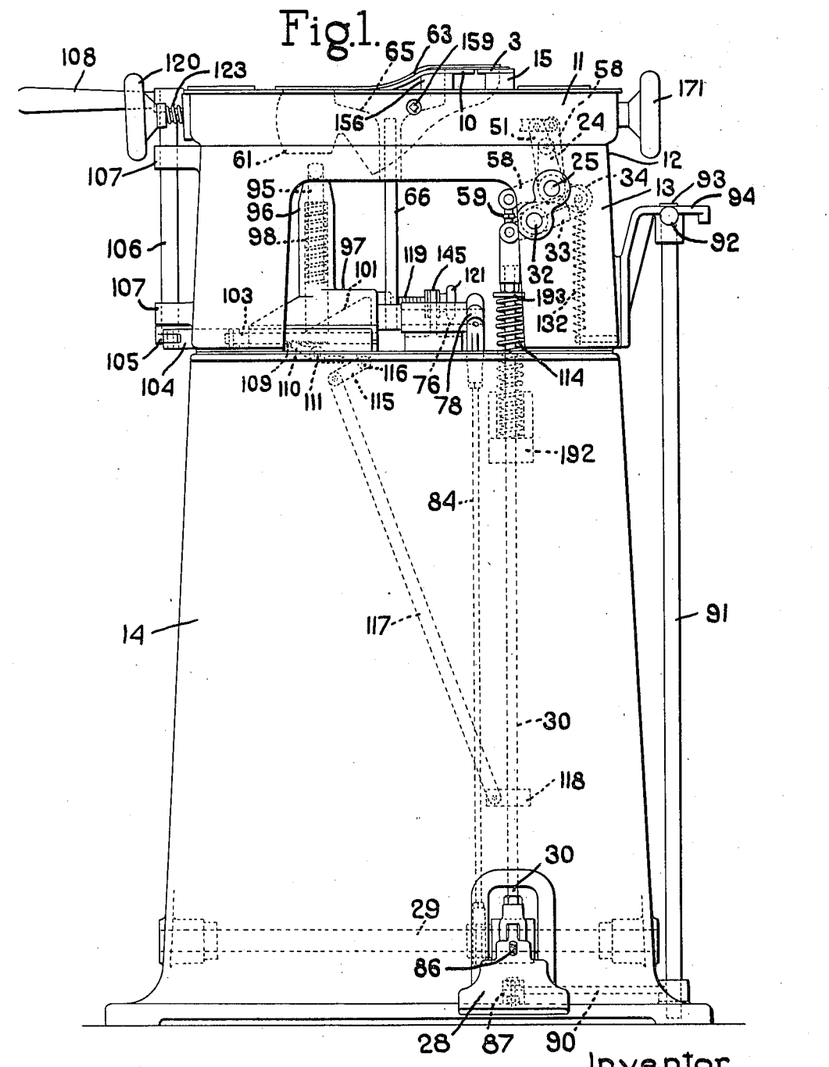
Fig. 1 is a side view of a lasting machine made in accordance with my invention.
Figures 2, 3:
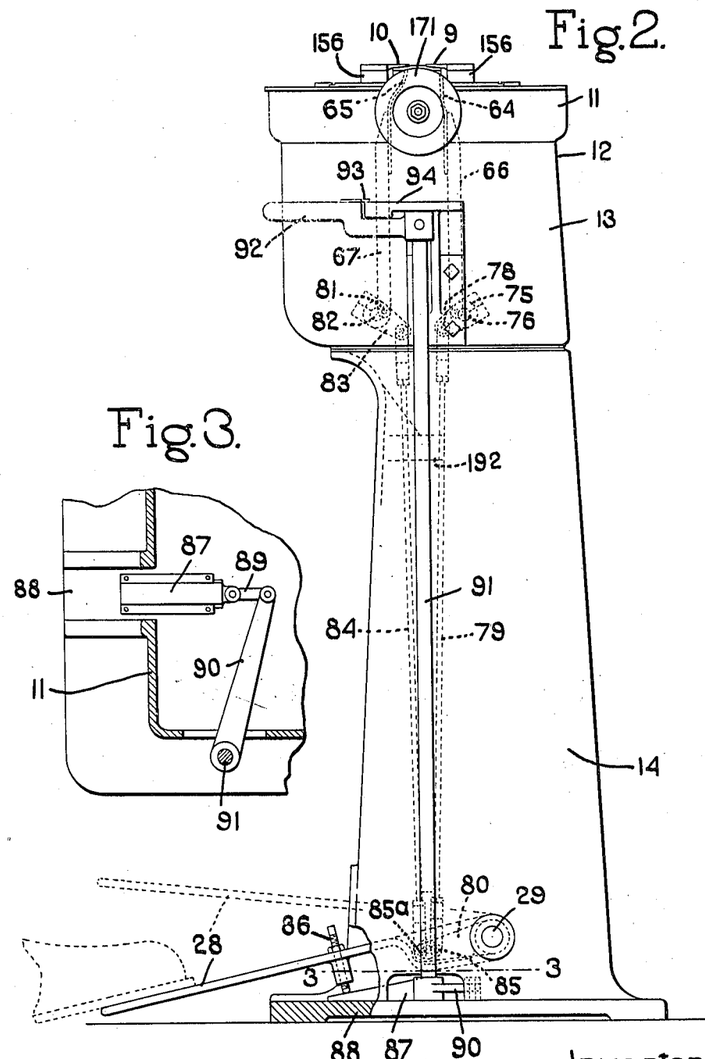
Fig. 2 is an end view looking toward the left, Fig. 1.
Fig. 3 is a fragmentary sectional view on the line 3—3, Fig. 2.

The treadle 28 is shown in the drawings in the lowered position which it assumes when it has been depressed by the operator, but when the treadle is released, it will be automatically raised into a position indicated by dotted lines in Fig. 2 by means of a spring 114 which encircles the upper end of the treadle rod 30. One end of this spring is backed by a collar 193 on the treadle rod 30, and the other end rests in a seat or support 192 carried by the pedestal 14. When the treadle is depressed, therefore, the spring 114 is compressed, but when the treadle is released, the expansion of the spring serves to raise the treadle and thus turn the shaft 32 clockwise from the position shown in Fig. 7 to that shown in Fig. 10, thereby giving the slides 36, 37 a retracting movement toward the right in Fig. 4. The pivoted blocks or arms 46 to which the swinging toe wipers 4 and 5 are secured and also the pivoted arms 21, 22, to which the swinging heel wipers 7 and 8 are pivoted are acted on by springs 203 which serve to move the swinging wipers outwardly when the slides 36, 37 have been retracted. These springs 203 are shown as encircling shouldered pins 204 which extend through lugs 205 carried by the swinging arms, the springs being confined between said lugs and the shoulder of the pin. Inward swinging movement of the arms, therefore, compresses the springs 203, and when the slides 36, 37 are retracted, these springs act to swing the arms and thus the swinging wipers outwardly.

The arm 24 which carries the roll 34 has one or more pulling springs 132 connected thereto, said springs serving to turn the arm 24 from the position shown in Fig. 7 to its initial position in Fig. 10 and thereby retract the toe wipers whenever the treadle 28 is released.

In the drawings, I have shown a last 61 to the bottom of which an insole 49 has been temporarily secured, and which has been assembled with a pre-welted upper 62, that is, an upper to which a welt 63 has been previously stitched. During the operative movements of the toe and heel wipers, above described, said wipers engage the upper 62 between the latter and the attached welt 63 and fold the edge of the upper over the bottom of the last and into proper position relative to the edge of the insole 49, as usual in pre-welt lasting machines.

The side wipers 9 and 10 by which the sides or shank portions of the upper are drawn tight over the last are carried by slides 52, 53, which are mounted in the upper section 11 of the housing for sliding movement transversely of the last. Each slide 52, 53 is provided with a cam slot 54 in which is received a roll 55 carried by a sliding bar 56 situated beneath the transverse slide 52 or 53.

With this arrangement, movement of the sliding bars 56 in the direction of their length will operate through the cam slots 54 and rolls 55 to move the wiper-carrying slides 52, 53 transversely.

The sliding bars 56 are given their operative movement by the depression of the treadle 28. The construction is such, however, that during the first portion of the downward movement of the treadle, both the slides 36, 37 and the sliding bars 56 are given an operative movement so that all of the wipers begin to close in onto the edge of the upper, while during the latter part of the downward movement of the treadle, the toe and heel wipers remain stationary while the side wipers 9 and 10 continue their forward or operative movement, thereby to insure that the shank portion of the upper is wrapped tightly around the last.

Each of the sliding bars 56 is connected by a link 57 to one arm of an elbow lever 58 that is loosely mounted on the shaft 25, as shown in Fig. 9. The other arm of each elbow lever 58 is connected through a link 59 with an arm 60 fast on the shaft 32 to which the treadle rod 30 is attached.

When the wipers are in their retracted position and the treadle is raised, the shafts 25 and 32 with the arms thereon are in the relative position shown in Fig. 10. During the first portion of the downward movement of the treadle and the corresponding turning movement of the rock shaft 32, the extension 33 of the arm 31 acts against the roll 34, thereby turning the shaft 25 and causing the toe wipers to move forwardly. This turning movement of the shaft 32 also operates through the links 59 and elbow levers 58 to move the slide bars 56 forwardly, thereby giving an initial movement to the side wipers 9 and 10.

When the shaft 32 has been turned into a position in which the roll 34 runs off from the end of the extension 33 and the concentric surface 35 begins to wipe by the roll, as shown in Fig. 7, then during further downward movement of the treadle, the carriage 16 and the swinging wipers will remain stationary, but because of the continued turning movement of the shaft 32, the sliding bars 56 will be given a further forward movement, thereby continuing the inward movement of the side wipers 9 and 10.

Figure 18:
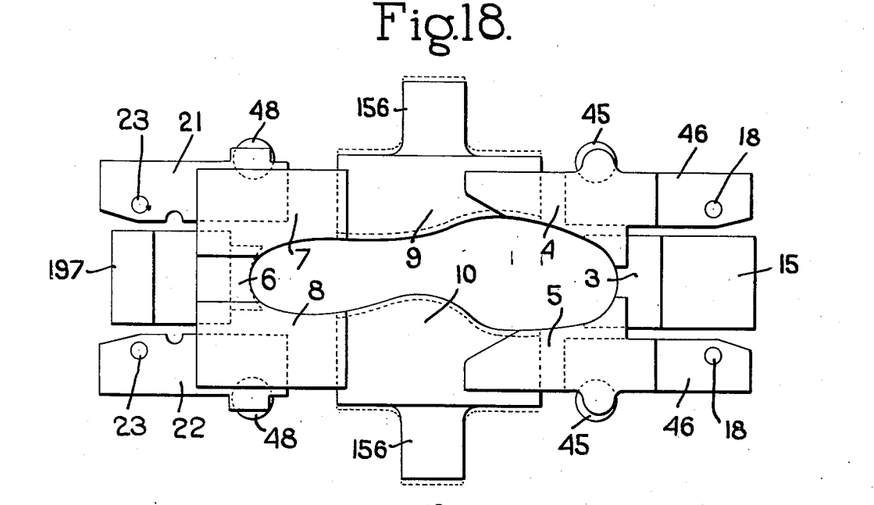
Fig. 18 is a plan view of the wipers.

This is illustrated somewhat diagrammatically in Fig. 18, wherein the dotted line position of the side wipers 9 and 10 may be considered as the position which said wipers occupy at the time that the toe and heel wipers have completed their operative movement, the movement of the side wipers from the dotted to the full line position being that which occurs while the concentric surface 35 of the arm 31 is wiping by the roll 34, and while the toe and heel wipers remain stationary in their innermost position.

The final pulling of the sides of the upper over the shank portion of the last, therefore, occurs after the wiping operation has been completed at the toe and heel portion of the last.

The side wipers 9 and 10 are detachably mounted on their supporting slides 52, 53, so that said wipers can be readily removed from the slides and replaced by other wipers having a different contour.

These side wipers 9 and 10 are also adjustable on their slides 52 and 53, so that their initial position may be changed or adjusted for different sizes and widths of shoes.

Each wiper plate 9 and 10 is shown as secured to a block 156 which rests on but is removable from a carriage 151 that is adjustably mounted on the slide 52 or 53. Each carriage 151 is adjusted transversely of the last by an adjusting screw 150, the shank of which occupies a groove in the wall 153 of the slide, said shank having two collars 152 thereon between which the wall 153 is received. The screw 150 is provided at its outer end with a wrench-receiving head 154 by which the screw may be rotated. This head 154 is made accessible through an opening 155 in the wall of the upper housing section 11. Each carriage 151 is provided with a positioning shoulder 194 with which the block 156 engages and by which it is properly positioned. Each block 156 is formed with a plate-like extension 193 which overlies the carriage 151, and each block is removably retained on the carriage by means of a spring-pressed locking pin 157 which is mounted in the carriage and is backed by a spring 158. The plate-like member 193 has an aperture to receive the upper end of the locking pin 157 when it is in its raised position, as shown in Fig. 8. When the pin 157 is depressed against the action of the spring 159, thereby to withdraw the pin from the plate-like extension 193, the block 156 with its attached wiper 9 or 10 can be readily removed from the machine.

To insert a wiper in the machine, it is only necessary to place the wiper in position with the plate-like member 193 overlying the carriage 52 or 53 and to adjust said wiper until the locking pin 157 registers with the hole in the plate. The spring 158 will then automatically raise the locking pin into the hole or aperture, thereby securing the wiper in place.

When a last 61 with an upper 62 assembled therewith, to which upper a welt 63 has been previously stitched, is placed in the machine ready for the lasting operation, there is sometimes a tendency for the upper and welt to sag somewhat at the sides of the shoe, so that the outer edge of the welt drops into the path of movement of the side wipers 9, 10.

One feature of the present invention relates to a novel welt support by which the side portions of the welt are supported in positions above the path of movement of the side wipers 9 and 10, thereby preventing said wipers from engaging the edge of the welt during their operative movement and insuring that the wipers will move in under the welt.

This welt support comprises two supporting plates 64, 65, which are carried by arms 66, 67, which are mounted in the lower section 13 of the two-part housing. These arms 66, 67 are acted on by springs which tend normally to force the welt-supporting plates 64, 65 toward each other, but which normally leaves them sufficiently separated to permit the last 61 with the upper 62 thereon to be forced between them. As herein shown, each arm 66, 67 has a link 68 pivotally connected thereto at 69, the end of the link extending through an aperture 70 in the side wall of the housing section 13. Surrounding the stem of each link 68 is a coil spring 71 which bears at one end against a shoulder 72 with which the link is provided, and at the other end bears against a collar 73 through which the stem of the link 68 loosely passes, said collar bearing against the wall of the housing member 13. The tendency of the springs 71 is to force the arms 66, 67 toward each other. The spring-impelled movement of each arm is limited by a check nut 74 screw-threaded to the outer end of the stem of the link 68.

Figure 11:
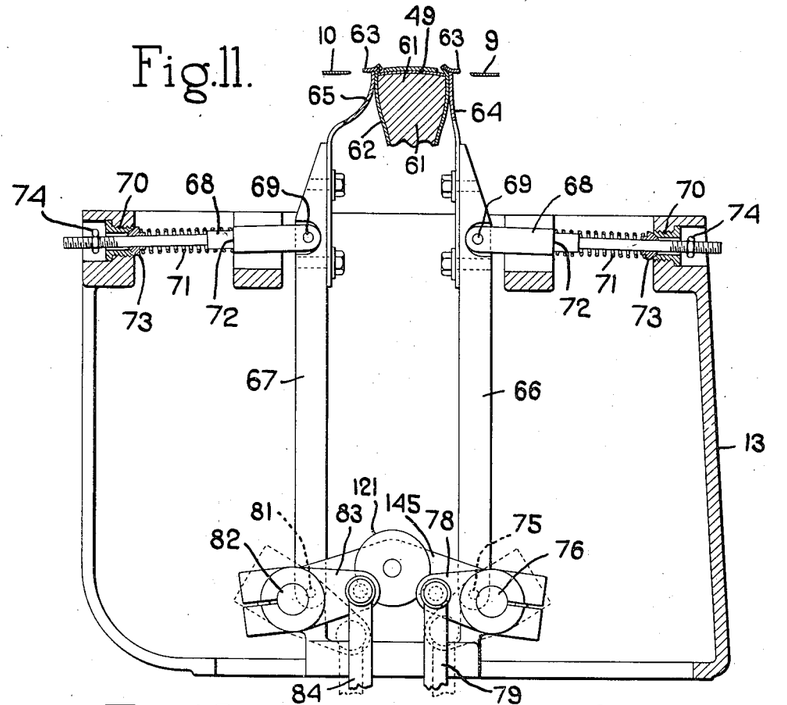
Fig. 11 is a vertical sectional view illustrating the welt-supporting elements and operating mechanism therefor.
Figure 19:
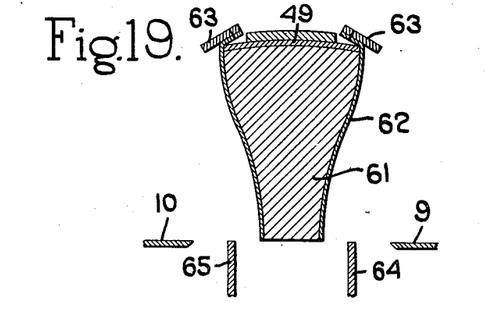
Fig. 19 is a fragmentary sectional view showing the side wipers and welt supports and illustrating the position of the latter as the shoe is placed in the lasting machine.
Figure 20:
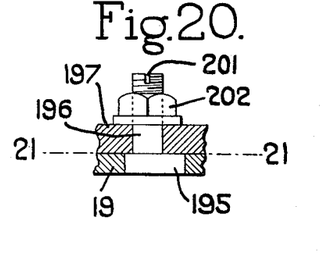
Fig. 20 is a fragmentary sectional view illustrating means for adjusting the heel wipers.
Figure 21:
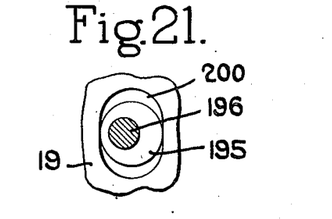
Fig. 21 is a section on the line 21—21, Fig. 20.

When the assembled shoe upper and last are placed in the machine, the top or narrow portion of the last will enter between the welt-supporting plates 64, 65, as shown in Fig. 19, and as the shoe and last are settled into position, the upper edges of these plates slide over the sides of the upper until they contact the welt 63, as seen in Fig. 11. When the shoe and last are thus properly positioned in the machine, the welt on each side of the shoe rests on and is supported by the welt-supporting plates 64, 65, and thereby said welt is held in a position above the path of movement of the side wipers 9 and 10.

When, therefore, the treadle 28 is depressed to give operative movement to the various wipers, the side portions of the welt 63 are maintained in a position above the side wipers 9 and 10 so that the latter will move in under the welt, and there is no danger that the side wipers will engage the edge of the welt.

Means are provided whereby as soon as the side wipers 9, 10 have moved in under the outer edge of the welt, the welt supporting plates are retracted or moved downwardly and thus are withdrawn from the path of movement of the side wipers 9 and 10. This withdrawing or retracting movement of the welt support is accomplished by the downward movement of the treadle 28 through the following mechanism.

Figures 14, 15:
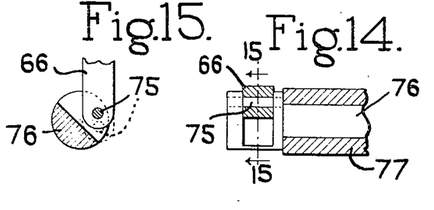
Fig. 14 is a fragmentary view illustrating part of the mechanism for withdrawing the welt supports.
Fig. 15 is a section on the line 15—15, Fig. 14.

The lower end of the arm 66 is pivotally connected to a pin 75 which is carried by a rock shaft 76 but is mounted eccentrically of said shaft, as shown in Figs. 14 and 15. This shaft 76 is journaled in suitable bearings 77 carried by the lower housing section 13, and said shaft has an arm 78 fast thereon to which is connected the upper end of a link 79 that has its lower end pivotally connected at 85 to an arm 80 fast on the treadle shaft 29.

The lower end of the arm 67 is similarly pivotally connected to a pin 81 carried by a shaft 82 also journaled in the lower housing section 13, said pin 81 having an eccentric relation to the shaft 82. This shaft 82 has an arm 83 fast thereon to which is pivotally connected the upper end of a link 84, the lower end of said link being pivoted at 85a to the arm 80.

Figure 12:
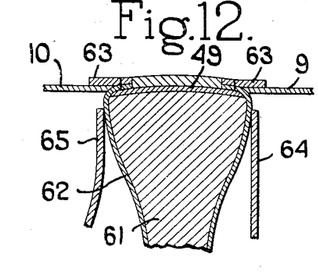
Fig. 12 is a fragmentary view showing the withdrawn position of the welt support after the side wipers have been moved forwardly into their operative position.
Figure 13:
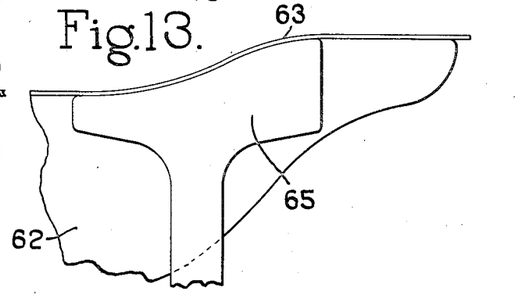
Fig. 13 is a fragmentary side view of one of the welt supports.

When, therefore, the treadle 28 is depressed and the treadle shaft 29 is thereby rocked, the downward swinging movement of the arm 80 acts through the links 79 and 84 to rock the shafts 76 and 82, and because of the eccentric relation of the pins 75 and 81, such rocking movement of the shafts produces a lowering movement of the welt supports 64, 65. This withdrawing movement of the welt supports, therefore, takes place coincidently with the inward movement of the side wipers, and thus the welt supports are withdrawn from the path of movement of the side wipers as the latter have their final inward movement, and as clearly shown in Fig. 12. The two links 79 and 84 are pivotally connected to the same arm 80 but at different distances from the axis of the shaft 29, and, therefore, when the treadle 28 is depressed, the link 84 will have a movement slightly greater than that of the link 79. To compensate for this, I make the arm 83 slightly longer than the arm 78 so that the two welt supports will have the same downward movement when the treadle is depressed.

I have provided herein an adjustable stop for the treadle 28 which limits its downward movement and which can be adjusted for different widths of shoes to insure that the treadle will be brought to rest when the wipers have been moved forwardly the correct distance to last properly a shoe of a given width.

The treadle 28 carries a stop screw 86, the lower end of which is adapted to engage a wedge-shaped stop member 87 that is mounted for sliding movement on the base 88 of the pedestal 14. This wedge-shaped stop member 87 is connected by a link 89 with an arm 90 that is fast on a vertical shaft 91 that stands alongside the pedestal 14. The upper end of the shaft 91 is provided with a handle or arm 92 by which the shaft can be turned. Turning movement of the shaft operates to move the wedge-shaped stop member 87 to the right or left Figs. 2 and 3, and because of the wedge shape of the member 87, a movement thereof to the left in Fig. 2 will place the stop in a position to bring the treadle 28 to rest at a point above that shown in full lines in Fig. 2.

Similarly, a movement of the wedge-shaped stop member 87 to the right will allow the treadle to be moved further downwardly.

The handle 92 carries an index or pointer 93 which operates over a scale 94. This scale is so graduated in shoe sizes that when the operator is working on shoes of a given width, he may set the handle 92 at the proper point to place the stop member 87 in the correct position to limit the downward movement of the treadle for that particular size of shoe.

Figures 16, 17:
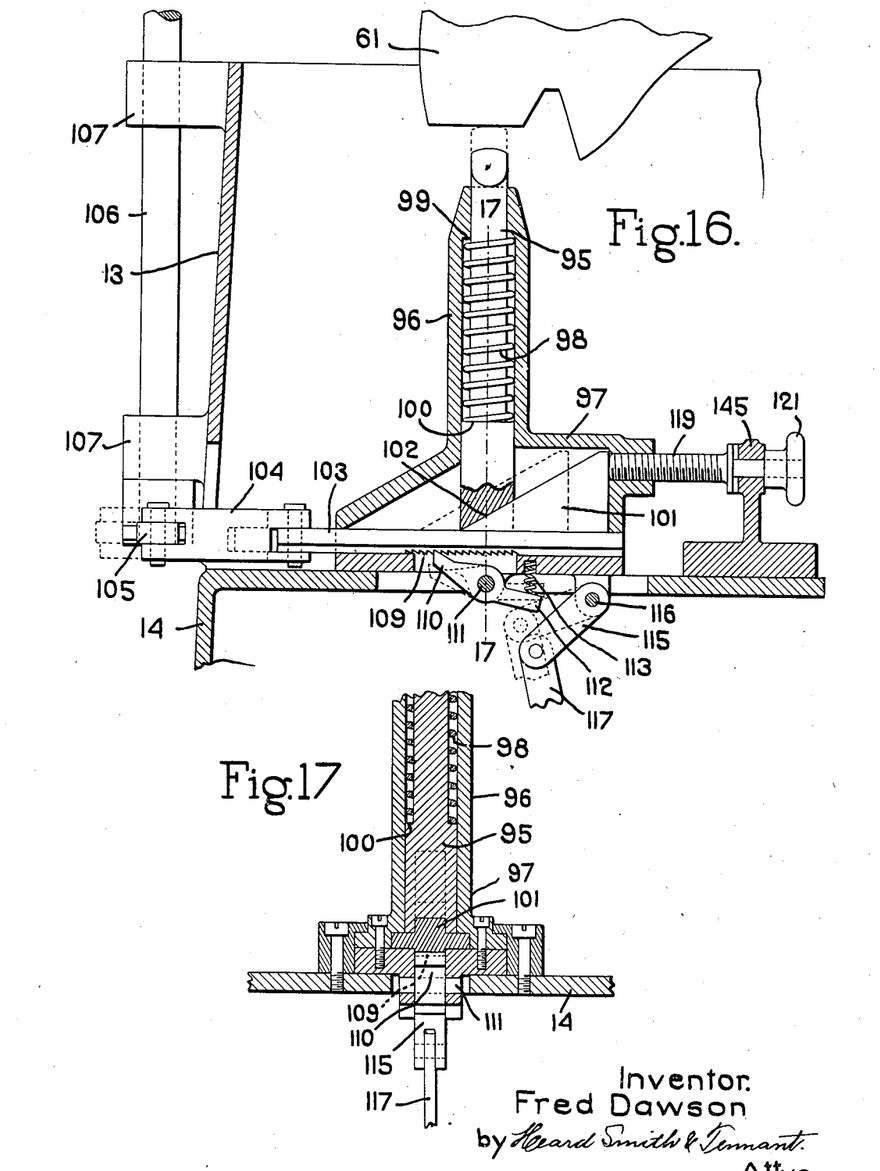
Fig. 16 is a fragmentary view illustrating the last support.
Fig. 17 is a section on the line 17—17, Fig. 16.

In pre-welt lasting machines of this type, it is customary to provide a vertically movable last support adapted to engage and support the heel portion of the last while the outer sole is being applied to the lasted shoe. Such last support is shown in Figs. 16 and 17, and it comprises a supporting pin 95 which is mounted for vertical movement in a supporting member comprising a hollow post 96 rising from a base 97. This supporting pin 95 is acted upon by a spring 98 which tends to depress said pin, one end of the spring 98 bearing against the interior shoulder 99 formed in the post, and the other end bearing against a shoulder 100 with which the pin is provided. Situated within the base 97 is a wedge unit comprising a wedge-shaped portion 101 and a slide portion 103. The lower end of the supporting pin 95 rests on the wedge-shaped portion 101, said lower end being inclined as shown at 102 to provide a proper bearing against the inclined surface of said wedge-shaped portion 101. The wedge-shaped portion 101 is mounted on the slide portion 103 and these two portions may be integral with each other as indicated in Fig. 17. The slide portion 103 extends through the base 97 and is connected by a link 104 to an arm 105 fast on a vertical shaft 106 that is journaled in suitable bearings 107 with which the lower housing section 13 is provided. This shaft 107 carries at its upper end a handle 108 by which the shaft 106 can be turned, thereby to shift the wedge unit 101, 103 within the housing or base 97.

After the assembled shoe upper and last have been placed in the machine and the wipers have been operated to wipe the edge of the upper over the bottom of the last, the operator then actuates the arm 108 thereby moving the wedge unit 101, 103 toward the left, Fig. 16, and causing the supporting pin 95 to be moved upwardly into engagement with the last 61, as shown in dotted lines, Fig. 16. The slide portion 103 of the wedge unit is provided on its lower face with ratchet teeth 109 which cooperate with a spring-pressed pawl 110 to prevent backward movement of the wedge unit. This pawl is pivotally mounted at 111 and is provided with a tail 112 that is acted on by a spring 113 which keeps the nose of the pawl in engagement with the ratchet.

When the handle 108 is turned to raise the last support 95, the pawl 110 will click over the teeth 109, and after the last support 95 has been brought into contact with the last for supporting the latter, the pawl 110 will lock the wedge unit 101, 103 from backward movement and will thus maintain the last support in its elevated position.

When the shoe has been lasted, the operator usually applies to the shoe bottom an outer sole which has been previously coated with cement, and in order to obtain good adhesion between the outer sole and the shoe bottom, including the welt 63, it is customary for the operator to subject the outer sole to repeated blows of a mallet or other implement. With the construction illustrated in Figs. 16 and 17, these hammer blows are received directly by the wedge-shaped portion 101 of the wedge unit and only indirectly by the pawl and ratchet, and thus the pawl and ratchet are relieved from the severe strain of hammer blows such as they would be subjected to if the pawl cooperated with the teeth on the rising and falling last support 95.

I have provided herein means whereby when the pressure on the treadle is relieved and the latter is raised by the action of the spring 114, the pawl 110 will be automatically disengaged from the ratchet teeth 109, thereby allowing the wedge unit 101, 103 to be moved back to its initial position and permitting the last support 95 to move downwardly into its lowered position.

For this purpose, I have provided a pawl-releasing arm 115 which is pivoted to the base 97 at 116, and which is connected by a link 117 to a collar 118 on the treadle rod 30. When the treadle is depressed, the downward movement of the rod 30 pulls the link 117 downwardly and thus swings the arm 115 into the full line position, Fig. 16, away from the tail 112 of the pawl. Said pawl is, therefore, free to function as above described. When pressure on the treadle 28 is released, however, and the latter is raised by the spring 114, the upward movement of the treadle rod 30 causes upward movement of the link 117, thereby swinging the pawl-releasing arm 115 into the dotted line position, Fig. 16, and causing it to engage the tail 112 of the pawl, thereby throwing the pawl out of engagement with the ratchet teeth 109, as shown in dotted lines, Fig. 16.

Figure 5:
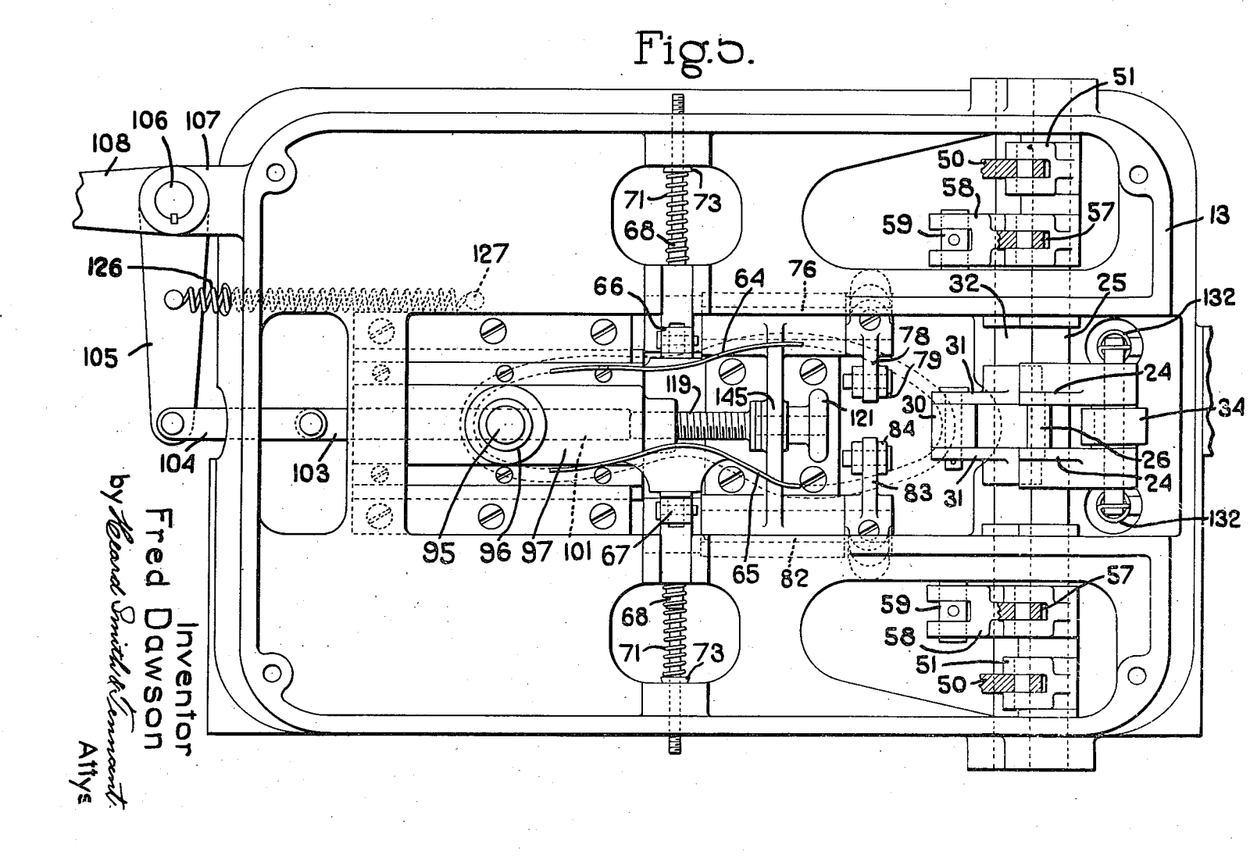
Fig. 5 is a plan view of the lower section of the housing showing the welt supports and means for operating them.

The arm 105 has connected thereto one end of a pulling spring 126, the other end of which is anchored to the housing section 13, as shown at 127. This spring has a normal tendency to swing the arm 105 to the right in Fig. 5, thereby to move the wedge-shaped member 101 into its retracted position, shown in Fig. 16. Consequently whenever the pawl 110 is released by the upward swinging movement of the arm 115, as shown by dotted lines, Fig. 16, the spring 126 functions to return the wedge-shaped block 101 to its initial position.

The last support, shown in Fig. 16 is made adjustable in the direction of the length of the last, so as to provide for placing the supporting pin 95 in a correct position for supporting properly lasts of different sizes. This adjustment is secured by means of an adjusting screw 119 which is rotatably mounted in the bearing member 145 and which has screw-threaded engagement with the base 97. The screw is provided with a hand wheel 121 by which it may be turned.

By rotating the adjusting screw 119 in one direction or the other, the position of the last-supporting member 95 may be adjusted lengthwise of the last and thus placed in the correct position for the particular size of the last being used. The adjustment of the base 97 by means of the screw 119 also adjusts the position of the last-supporting member 95 relative to the wedge 101 and thereby determines the normal retracted position of said last-supporting memmer, it being understood that normally, the spring 98 holds the last-supporting member 95 in its lowered position in contact with the wedge member 101.

I claim:

1. A pre-welt lasting machine comprisng a plurality of wipers for folding the welt-carrying edge of the upper over the bottom of the last, said wipers including a pair of of wipers acting on the upper at the sides of the shoe, means to operate the wipers, and a welt support to engage the welt at the sides of the shoe and support it above the path of movement of the side wipers.

2. A pre-welt lasting machine comprising a plurality of wipers for folding the welt-carrying edge of the upper over the bottom of the last, said wipers including two side wipers for operating on the sides of the shoe being lasted, means to operate the wipers, two welt-supporting elements, on either side of said shoe, and each adapted to engage the welt and support in a position above the path of movement of the corresponding side wiper.

3. A pre-welt lasting machine comprising a plurality of wipers to engage the upper between the upper and the welt attached thereto and to wipe the edge of the upper over the bottom of the last, means to operate the wipers, a welt support for engaging the welt and supporting it above the path of movement of the wipers, and means to retract the welt support during the operative movement of the wipers.

4. A pre-welt lasting machine comprising a plurality of wipers to engage the upper between the latter and the welt attached thereto, means to operate the wipers to fold the welt-carrying edge of the upper over the bottom of the last, two welt-supporting elements, one either side of the shoe being lasted and each adapted to engage the welt and support it in a position above the path of movement of the wipers, and means to retract the welt-supporting elements during the operative movement of the wipers.

5. A pre-welt lasting machine comprising a plurality of wipers for folding the welt-carrying edge of the upper over the bottom of the last, wiper-operating mechanism, a welt support for engaging the welt and supporting it above the path of movement of the wipers, and means actuated by the wiper-operating mechanism to retract the welt support during the operative movement of the wipers.

6. A pre-welt lasting machine comprising a plurality of wipers for folding the welt-carrying edge of the upper over the bottom of the last, wiper-operating mechanism including a treadle, a welt support for engaging the welt and supporting it above the path of movement of the wipers, and means actuated by the treadle to retract the welt support during the operative movement of the wipers.

7. A pre-welt lasting machine comprising a plurality of wipers for folding the welt-carrying edge of the upper over the bottom of the last, means, including a treadle, for operating the wipers, two welt-supporting elements to engage the welt at each side of the shoe and support it above the path of movement of the wipers, two pivotally mounted arms swingable toward and from each other on which said welt-supporting elements are carried, springs acting on said arms and yieldingly holding the welt-supporting elements in operative position to receive between them a shoe to be lasted.

8. A pre-welt lasting machine comprising a plurality of wipers for folding the welt-carrying edge of the upper over the bottom of the last, means, including a treadle, for operating the wipers, two welt-supporting elements to engage the welt at each side of the shoe and support it above the path of movement of the wipers, two pivotally mounted arms swingable toward and from each other on which said welt-supporting elements are carried, springs acting on said arms and yieldingly holding the welt-supporting elements in operative position to receive between them a shoe to be lasted, a rock shaft for each arm, a connection between each rock shaft and its arm by which turning movement of the rock shaft will give the arm and its welt-supporting element a retracting movement, and means actuated by the treadle to turn the rock shafts.

9. A lasting machine comprising a plurality of wipers including toe wipers, heel wipers and side wipers, a treadle, connections between the treadle and the side wipers by which the latter are given their operative movement as the treadle is depressed, and means actuated by said connections to operate the toe and heel wipers and to complete their operative movement prior to the termination of the operative movement of the side wipers.

10. A lasting machine comprising a plurality of wipers including toe wipers, heel wipers and side wipers, a treadle, connections between the treadle and the side wipers by which the latter are given their operative movement as the treadle is depressed, said connections including a rock shaft, a second rock shaft, connections between the latter and the toe and heel wipers by which said toe and heel wipers are operated as the second rock shaft is turned, and means to turn the second rock shaft by the turning movement of the first rock shaft, said latter means operating to give the second rock shaft its complete turning movement before the treadle has been completely depressed.

11. A lasting machine comprising a plurality of wipers including heel wipers, toe wipers and side wipers, a treadle, connections between the treadle and the side wipers by which the latter are given their operative movement as the treadle is depressed, said connections including a rock shaft, a second rock shaft, connections between the second rock shaft and the toe and heel wipers by which the latter are operated as said second rock shaft is turned, an arm on the first rock shaft having its end formed on an arc concentric with said shaft, a cooperating arm on the second rock shaft adapted to be engaged and operated by the first-mentioned arm as the first-mentioned rock shaft is turned, said arms having such a relation that the contact point between the arms will pass onto the concentric end of the first arm before the treadle is fully depressed, whereby the operative movement of the toe and heel wipers will be terminated before the operative movement of the side wipers has been completed.

12. A lasting machine comprising a plurality of wipers, means for operating said wipers, said means including a treadle, an adjustable wedge-shaped stop member beneath the treadle to limit its downward movement, and means to adjust said stop member.

13. A lasting machine comprising a plurality of wipers, means to operate said wipers, said means including a treadle, a stop screw carried by the treadle, an adjustable wedge-shaped stop member beneath the treadle and adapted to be engaged by the stop screw to limit the downward movement of the treadle, and means to adjust the stop member relative to the treadle.

14. A lasting machine comprising a plurality of wipers, means for operating said wipers, said means including a treadle, a spring normally holding the treadle raised, a vertically movable last-supporting pin, an adjustable wedge-shaped member on which the pin rests, means to move said wedge-shaped member horizontally, thereby to raise the pin into engagement with the last, releasable means for holding the wedge-shaped member in its adjusted position, and means to release said releasable means when the treadle is raised.

15. A lasting machine comprising a plurality of wipers, means for operating said wipers, said means including a treadle, a spring normally holding the treadle raised, a vertically movable last-supporting pin, an adjustable wedge-shaped member on which the pin rests, means to move said wedge-shaped member horizontally, thereby to raise the pin into engagement with the last, a pawl cooperating with said wedge-shaped member to hold it in its adjusted position, and means actuated by the treadle when the latter is raised to release the pawl.

16. A pre-welt lasting machine comprising a plurality of wipers for folding the welt-carrying edge of the upper over the bottom of the last, means to operate the wipers, a welt support having a welt-engaging edge normally situated above the path of movement of the wipers, and means to give the welt support a downward retracting movement during the operative movement of the wipers.

17. A pre-welt lasting machine comprising a plurality of wipers for folding the welt carrying edge of the upper over the bottom of the last, means to operate the wipers, a welt support for engaging the under face of the welt and supporting it above the path of movement of the wipers, and means to give the welt support a downward retracting movement during the operative movement of the wipers.

18. A pre-welt lasting machine comprising a plurality of wipers for folding the welt-carrying edge of the upper over the bottom of the last, means to operate the wipers, a welt support separate from the wipers and adapted to engage the under face of the welt and support it above the path of movement of the wipers, and means to give the welt support a downward retracting movement during the operative movement of the wipers.

19. A lasting machine comprising a plurality of wipers including toe wipers, heel wipers, and side wipers, wiper-actuating mechanism including means for giving all the wipers simultaneous forward movement until the toe and heel wipers complete their movement and then giving the side wipers a further advancing movement.

20. A lasting machine comprising a plurality of wipers, means for operating said wipers, a support adjustable lengthwise of a shoe presented to said wipers, a last-supporting pin slidable vertically in said support, a movable wedge-shaped member on which said last-supporting pin rests, means for moving said wedge-shaped member to raise said pin into engagement with a last, and means for adjusting said support with respect to said wedge-shaped member to determine the normal lowered position of said pin.

21. A lasting machine comprising a plurality of wipers, means for operating said wipers, a support adjustable lengthwise of a shoe presented to said wipers, a last-supporting pin slidable vertically in said support, a movable wedge-shaped member on which said last-supporting pin rests, means for moving said wedge-shaped member to raise said pin into engagement with a last, a spring acting on said pin and resisting its upward movement, and means for adjusting said support with respect to said wedge-shaped member to determine the normal lowered position of said pin.

FRED DAWSON.